United States Patent Office 3,446,356
Patented May 27, 1969

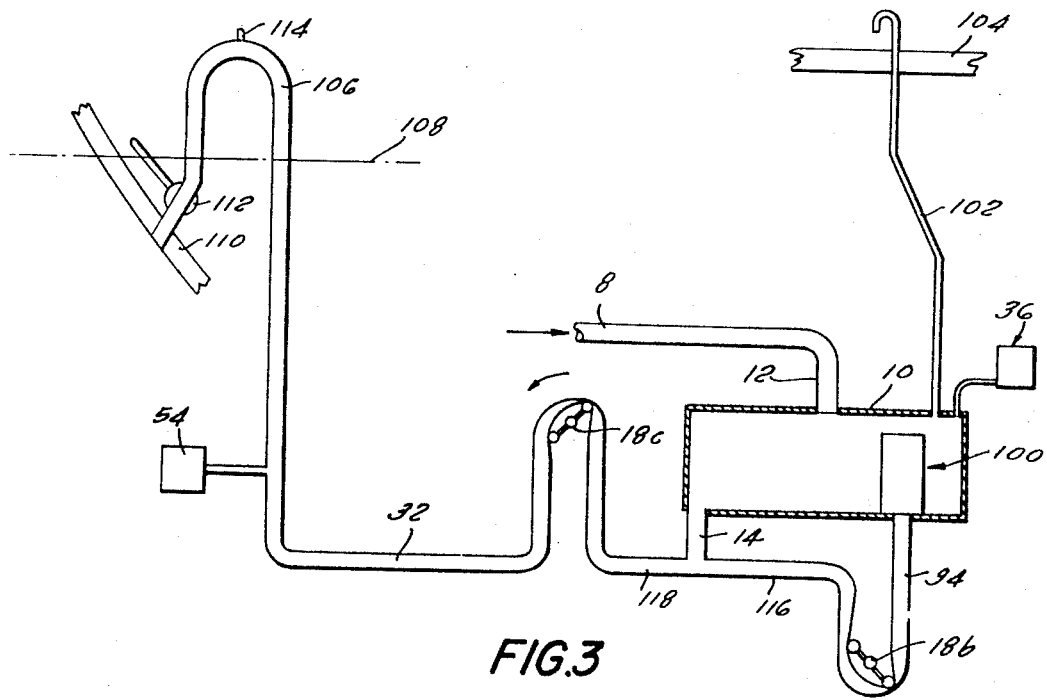
FIG.3
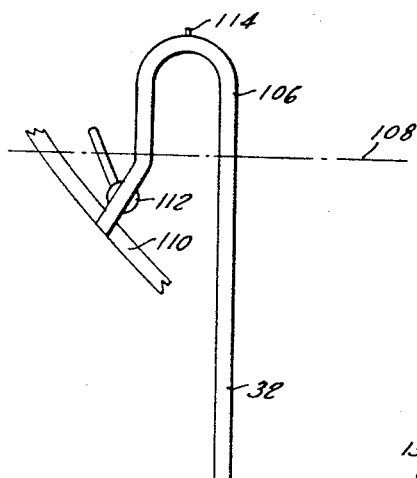
FIG.4
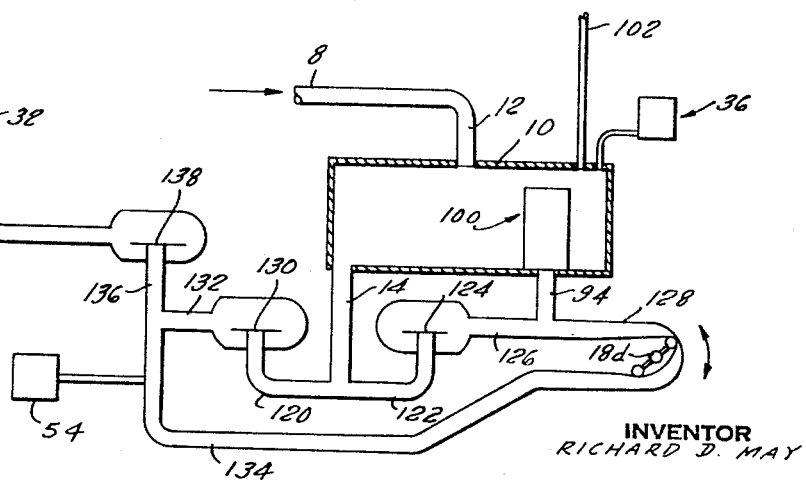

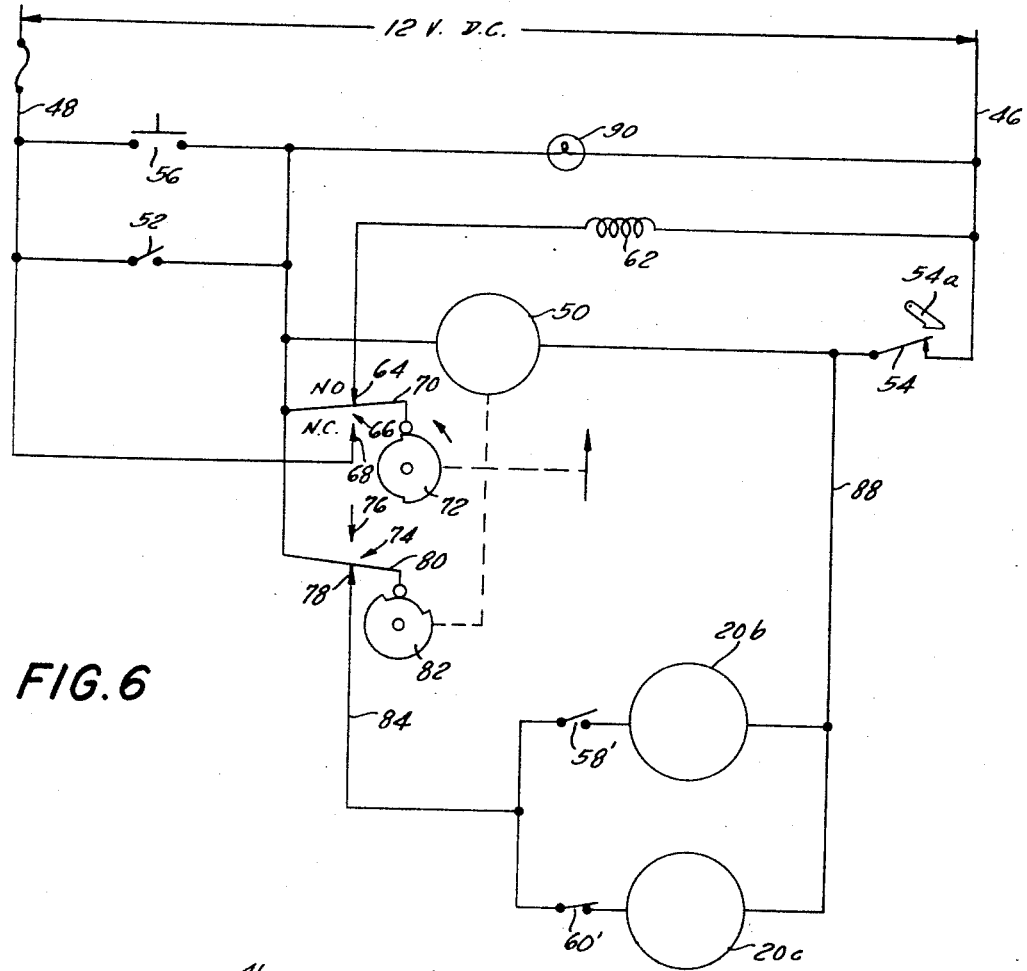
FIG. 6
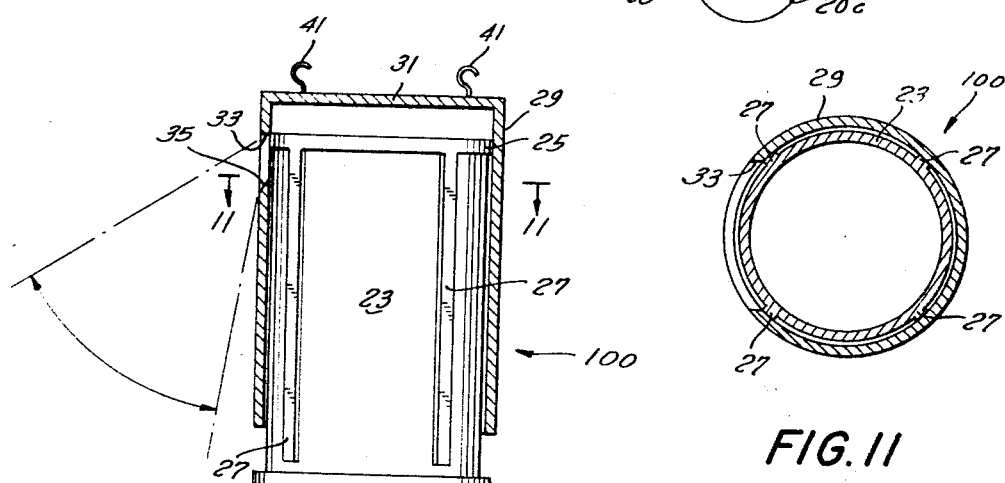
FIG. 10
FIG. 11
INVENTOR
RICHARD D. MAY
BY Jameson Franklin
ATTORNEY

3,446,356
WASTE DISPOSAL SYSTEM
Richard D. May, Twin Bridge Acres Road,
Westport, Conn. 06880
Filed Nov. 29, 1966, Ser. No. 597,765
Int. Cl. B01d 21/24, 33/38
U.S. Cl. 210—117                                   19 Claims

ABSTRACT OF THE DISCLOSURE

A system for the disposal of waste from toilets, in which the toilet waste is fed into a tank, the contents of the tank are recirculated independently of the toilet, thereby to break down the solids content thereof, the contents of the tank subsequently being discharged. A pressure-sensitive telescoping structure of novel design is utilized to assist in the breaking up of such solids content.

---

The present invention relates to a waste disposal system, and in particular to one specially adapted for use in the disposal of waste emanating from marine toilets.

The problem of disposal of waste products is becoming increasingly critical, particularly with regard to those wastes which are discharged into bodies of water. The problem of water pollution arising from such waste material is fast becoming a national crisis. Such pollution in its initial stages affects marine life only, but in its latter stages affects the well-being of individuals by rendering the water non-bathable as well as non-drinkable.

Up until recently the major offenders in the poisoning of rivers, lakes and seacoasts have been such large scale sources of pollution as municipal garbage and sewage disposal plants and industrial plants. More recently, as the number of pleasure boats plying the nation's recreational waters has multiplied, the problems of pollution by waste discharge from such boats has assumed serious proportions, particularly with regard to untreated sewage which is discharged directly from the boats into the body of water on which they are floating. Large plants can readily install systems capable of treating the waste products before they are discharged, and much progress has been made along these lines. The present invention is of particular applicability in connection with small-scale installation such as those capable of being incorporated into pleasure craft, a field where, up to now, no solution of the problem of waste disposal, and particularly sewage disposal, has been available.

A waste disposal system suitable for use on a pleasure boat must be inexpensive, must take up only a minimal amount of space, should operate reliably with but a minimal amount of personal attention required, and, of course, must be effective in minimizing or eliminating the polluting effect of those substances discharged from the system. It is the prime object of the present invention to devise a system which will satisfy all of these requirements.

In an effective waste disposal system the discharge must be as highly liquid as possible, and such solids content as it may have should be in as finely broken down condition as possible, in order that the system discharge should readily dissolve in and be carried away by the body of water into which it is discharged. Where sewage and human waste is involved chemical treatment such as disinfection is also required or desirable in order that health-imperiling bacilli be killed or rendered impotent. Some sort of grinding or comminuting action is required in order to achieve the first objective—solids-reduction; exposure of the contents of the system to an appropriate chemical reagent for a predetermined period of time is required to achieve the second objective—disinfection or the like. System components have been used in the past to accomplish one objective or the other, but in the main different components have been required to achieve each such objective. It is an object of the present invention to devise a system in which the reduction of the solids content of the waste material is achieved substantially simultaneously with the appropriate chemical treatment thereof, and through the use of the same system components.

The varied nature of materials which must be dealt with in systems of the type under discussion presents a special problem. Devices which will effectively reduce solids are in general highly susceptible to being clogged by such substances as paper, yet a clog-proof system is required even though paper may constitute a substantial proportion of the contents of the system. Since, as will be seen, fluid recirculation is an important part of the system here disclosed, and that recirculation is positively achieved by means of pumps it is necessary that the pumps be essentially clog-proof in operation; such pumps can produce only a minimal solids-reduction effect. Other means must therefore be provided for solids-reduction, and in the system of the present invention a highly effective such means is disclosed which comprises a narrow slot through which the materials being treated is forced, the size of the slot automatically varying in accordance with the nature of the material passing therethrough so as to produce a maximum solids-reduction effect while maintaining an essentially clog-proof operating characteristic.

The system of the present invention is particularly well adapted for selective operation only when required. Its operation is of a two-stage character. After the waste to be disposed of is introduced into a tank or other receptacle, the first stage of treatment involves forced recirculation of the contents of the tank, this being accompanied by a solids-reduction action, as by forcing the material through the slot of variable size above described in the course of its recirculation. The recirculation stage continues for a period of time such as to reduce the solids content to a predetermined extent. In the second stage, which may follow immediately after the first stage or commenec a predetermined period of time after recirculation has stopped, the contents of the tank are discharged from the system.

The recirculation and discharge are accomplished by means of one or more motor driven pumps and appropriate conduits and valving. In some of the disclosed embodiments but a single pump is employed, which may be operated in one direction for recirculation and in the other for discharging, or which may be operated in the same direction during both stages of operation, selection of the desired stage being accomplished by means of appropriately controlled valves. In other embodiments separate pumps are employed for recirculation and discharging respectively with valves being appropriately shifted to produce the desired system connections. In many disclosed instances the system connections are such that the valves will be appropriately shifted automatically depending upon the direction of rotation of the pump or the particular pump which is energized at a given time, so that pump control is all that need be done.

In a preferred embodiment the introduction of treating chemicals to the contents of the system is effected automatically in accordance with the operation of the system. As specifically disclosed the movement of the system contents through the means provided for solids-reduction during recirculation is utilized to actuate the means which feeds such chemicals to the system.

As a result the waste disposal system, when once placed in operation, will, during the recirculation stage, simultaneously and automatically reduce the solids content of the material being treated and subject that material to appropriate chemical action, after which the solids-reduced and chemically treated material will automatically be discharged from the system at an appropriate time, the discharged contents thus being in a condition such as to minimize or eliminate pollution. The structure involved is simple, sturdy, clog-proof and reliable, will take up only a minimal amount of space, thereby being well adapted for use on shipboard where space is at a premium, and will consume only a minimal amount of power.

It is noteworthy that when the system of the present invention is used to dispose of waste products coming from a toilet, the waste products are received, treated and discharged after each use of the toilet without having to wait for the next use of the toilet, thereby functioning in a highly sanitary manner.

To the accomplishment of the above, and to such other objects as may hereinafter appear, the present invention relates to a waste disposal system as defined in the appended claims and as described in this specification, taken together with the accompanying drawings, in which:

FIG. 3 is a schematic diagram similar to FIG. 2 but showing a system in which two pumps are employed, each selectively energized for recirculation and discharge respectively;

FIG. 4 is a schematic diagram similar to FIG. 2 but showing yet another embodiment in which a single pump is driven in opposite directions for recirculation and discharge respectively and in which the valving is automatically operative in response to the direction of rotation of the pumps;

FIG. 6 is a circuit diagram of electrical controls effective for use with a system such as that of FIG. 3;

FIG. 10 is a side elevational view on an enlarged scale of the solids-reducing recirculation input to the tank, the outer telescoping cup member being shown in cross section; and FIG. 11 is a cross-sectional view taken along the line 11—11 of FIG. 10.

Figure 1:
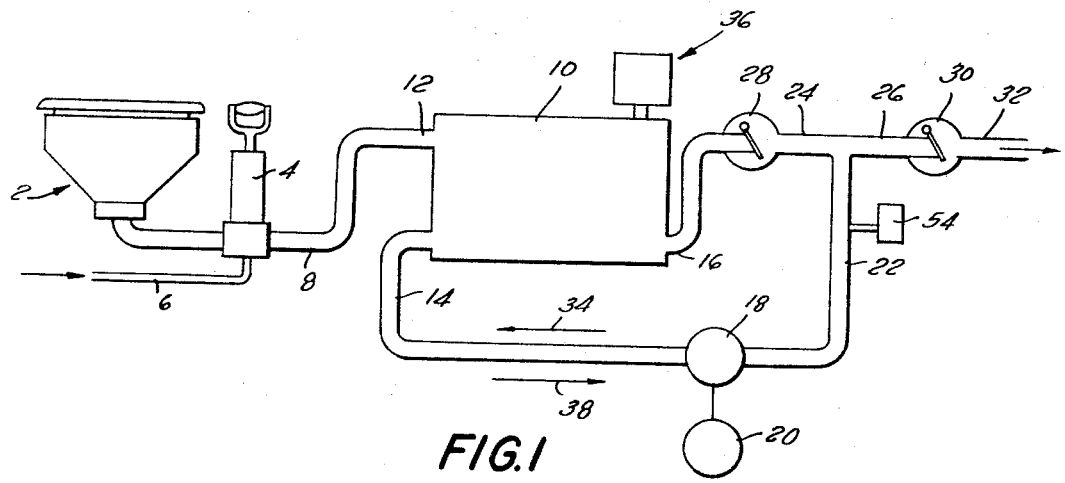
FIG. 1 is a schematic diagram of one embodiment of the present invention used for disposing of waste material from a marine toilet, a single motor-driven pump being operated in one direction for recirculation and in the other direction for discharge, the valves functioning automatically as the direction of action of the pump changes.

In FIG. 1 a conventional marine toilet 2 is shown associated with a manually actuated positive displacement pump 4 which is effective when actuated, as is conventional in marine toilets, to draw sea water in through inlet pipe 6 and to flush the contents of the toilet out through outlet pipe 8. The thus-defined source of waste material is, of course, but exemplary.

As disclosed in FIG. 1 the system for disposing of the waste from the toilet 2 comprises a tank 10 having an inlet pipe 12 in communication with the toilet outlet pipe 8. The tank 10 is further provided with a pair of pipes 14 and 16 communicating with the interior thereof. The pipe 14 is connected to one side of pump 18 driven by motor 20. The other side of the pump 18 is connected to pipe 22 which communicates in a T-joint with pipes 24 and 26. Check valve 28 connects the pipes 16 and 24, and check valve 30 connects pipe 26 to discharge pipe 32. Each of the check valves 28 and 30 are so designed as to permit fluid flow from left to right as viewed in FIG. 1 but to prevent fluid flow from right to left as there viewed. The precise nature of the check valves 28 and 30 forms no part of the present invention, and they are therefore more or less schematically indicated. A pressure-sensitive switch generally designated 54 may be operatively connected to the system, as at pipe 22. The pump 18 is designed to be operated reversibly. This can be accomplished either by using a reversible motor 20 rigidly connected thereto or by connecting a uni-directional motor 20 thereto by means of reversible gearing or the like.

In operating the system of FIG. 1, the toilet 2 is flushed by actuating the pump 4 in conventional fashion. The contents of the toilet 2 are thus pumped into the tank 10 via the inlet pipe 12. Next the pump 18 is driven so as to pump in the direction indicated by the arrow 34, the pipe 22 being an inlet to the pump 18 and the pipe 14 being an outlet therefrom. As a result the contents of the tank 10 will be withdrawn from the tank through pipe 16, will pass through check valve 28 and pipe 24, will be drawn down through pipe 22, and will be pumped back into the tank 10 through pipe 14. The check valve 30 will be automatically closed by the pressure of the recirculated fluid. This recirculation of the tank contents will continue for as long as the pump 18 is operated in the specified direction. The action of the pump 18 will tend to break down and comminute the solids content of the waste material, but the extent to which this can be done in the pump 18 without clogging may be limited. Accordingly any suitable additional solids-reduction means may be introduced into the recirculation system. Any suitable means, generally indicated by the box 36 in FIG. 1, may be provided for supplying a predetermined dose of appropriate treating chemical or chemicals to the contents of the tank 10 at the beginning of or during the recirculation process. There are many chemical formulations known to be effective or desirable, and the particular chemical formulation employed forms no part of the present invention. The chlorine-containing product sold under the trade name "Clorox" is widely used for such purposes.

After the recirculation process has been continued for a period of time appropriate to produce the desired reduction in solids content of the waste material the recirculation stage stops. If additional time for chemical action is required, the system dwells. Thereafter the direction of operation of the pump 18 is reversed, the pump then pumping in the direction of the arrow 38 in FIG. 1. The contents of the tank 10 are removed through pipe 14 and are pumped by pump 18 through pipe 22. The pressure of the pumped fluid will close check valve 28, thus preventing recirculation of the waste material, and will open check valve 30, the waste material then discharging from the system through pipe 32.

Figure 5:
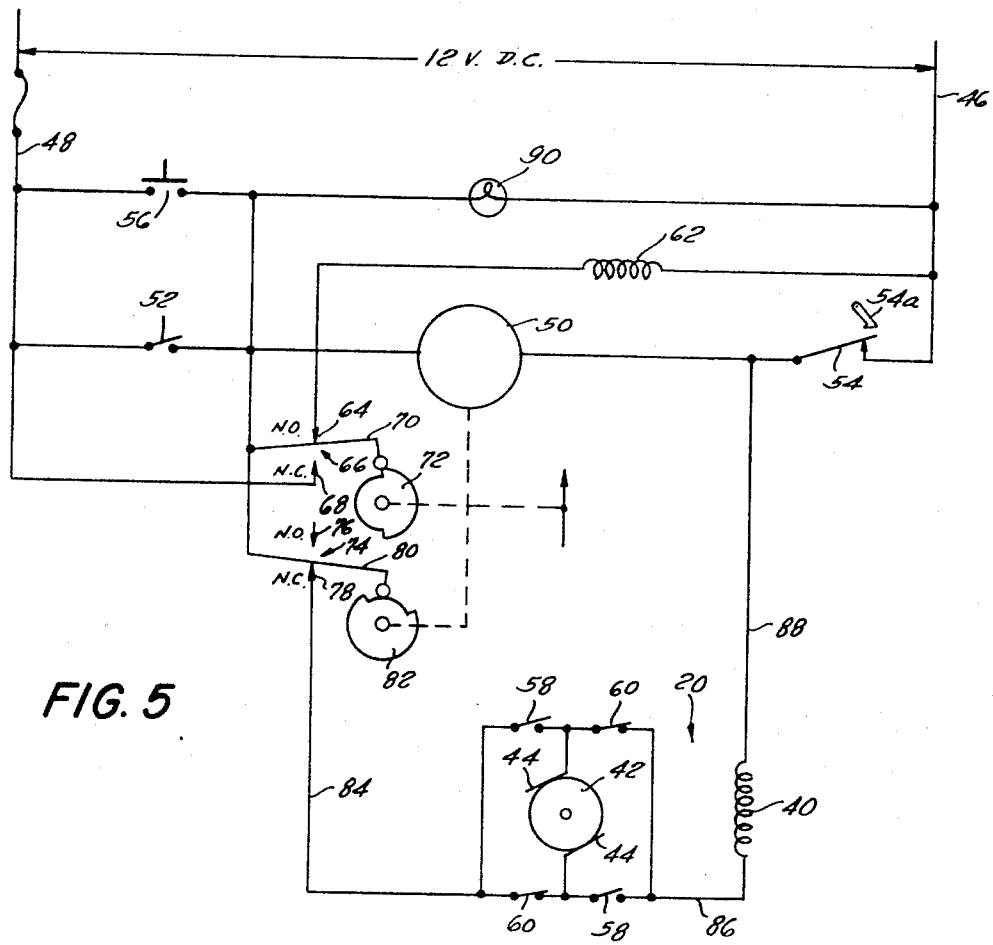
FIG. 5 is a circuit diagram of electrical controls effective for use with systems such as those of FIGS. 1 and 4.

A typical electrical control circuit effective for use with the system of FIG. 1 is shown in FIG. 5. The motor 20 which drives the pump 18 comprises a field winding 40 and an armature 42 to which electrical connections are made by means of brushes 44. A source of power, such as a 12-volt battery, is connected across input leads 46 and 48. A control or timing motor 50 has one end connected to line 48 via normally open relay switch 52 and has its other end connected to line 46 via normally closed switch 54 which is sensitive to fluid pressure in the system. A manually actuated starting switch 56 is connected across the relay switch 52. A pair of normally open relay switches 58 and a pair of normally closed relay switches 60 are connected to the brushes 44 in essentially conventional fashion, as shown, so as to control the direction of current flow through the motor armature 42 and hence the direction of rotation thereof. A relay actuating coil 62 active upon the relay switches 52, 58 and 60, is connected between line 46 and fixed contact 64 of switch 66, the switch 66 also comprising fixed contact 68 connected to line 48 and movable switch arm 70 connected to the right hand side of relay switch 52. A cam 72 driven by the timing motor 50 controls the position of the switch arm 70, causing it to engage with one or the other of the fixed contacts 64 and 68. A second switch 74 comprises blind fixed contact 76 and active fixed contact 78, between which switch arm 80 is adapted to move, the latter being positioned by cam 82 also driven by the timing motor 50. The switch arm 80 is electrically connected to the switch arm 70 and to the right hand side of the relay switch 52. The active contact 78 of the switch 74 is electrically connected by lead 84 to one side of the switch network 58, 60, the other side of the switch network being connected by lead 86 to one side of the pump motor field winding 40, the other side of the winding 40 being connected by lead 88 and pressure switch 54 to line 46. An indicating light 90 is connected between line 46 and the right hand side of relay switch 52.

FIG. 5 shows the position of the parts before a treatment cycle starts. The cams 72 and 82 are designed to rotate in a counterclockwise direction as shown. As illustrated the circuits to the timing motor 50, the pump motor 20 and the relay winding 62 are all open. To start the waste treatment cycle the switch 56 is closed. This causes the light 90 to glow, indicating that a treating cycle is underway. It also closes a circuit through the timing motor 50 and, via the switch 74, through the pump motor 20. A circuit is also completed through the relay winding 62 via the switch 66. This closes the switches 58 and opens the switches 60, thus causing the motor 20 to rotate in its recirculating direction, the circuit to the motor being closed through switch 74. The relay switch 52 is closed, thus keeping the timing motor 50, the pump motor 20 and the relay winding 62 energized even though the manual switch 56 may be released. Operation of the pump motor 20 in the recirculation direction will continue until the cam 82 has rotated sufficiently to lift the arm 80 of switch 74 from the active contact 78. This will open the circuit to the pump motor 20 and that motor will stop. Recirculation of the waste material will therefore stop, but the relay winding 62, and hence the timing motor 50, remains energized and the cams 72 and 82 continue to turn, although the motor 20 remain de-energized. After a predetermined period of time cam 72 will rotate sufficiently for arm 70 of switch 66 to disengage from contact 64 and engage with contact 68. This will de-energize relay winding 62, thus causing relay switches 58 to open and relay switches 60 to close, conditioning the pump motor 20 to rotate in the discharge direction. Relay switch 52 will open but timing motor 50 will remain energized via switch arm 70 and fixed contact 68. The circuit to the pump motor 20 remains open because the switch arm 80 is lifted from the contact 78. After a time, cam 82 rotates sufficiently for arm 80 to once again engage contact 78, maintained in connection with line 48 via switch arm 70 and fixed contact 68, thus energizing the pump motor 20 and driving it in its discharge direction. The operation of the pump 18 in discharge fashion will continue until the cam 72 lifts the arm 70 from the contact 68, thus breaking the circuit both of the timing motor 50 and the pump motor 20, and restoring the system to its initial condition as described.

Thus it will be seen that the system of FIG. 1 is operated for a predetermined period of time to produce recirculation sufficient to reduce the solids content of the waste material to a desired value, the waste material is permitted to stand an additional period of time while being acted upon by appropriate chemical reagents, after which the treated waste material is discharged from the system. During the treatment cycle the light 90 remains on to indicate to personnel that a treatment cycle is underway, and after discharge of the waste material has been accomplished the light 90 goes off, thus indicating to personnel that the system is ready for another cycle of operation.

The pressure switch 54 shown in FIG. 5 is an optional refinement, desirable for use when the pump 18 is of a type susceptible to damage when operated at high pressures such as might be caused by clogging of the fluid system. When the pressure of the system exceeds a predetermined value the switch 54 is automatically opened and remains open, as indicated by the latch 54a, until reset manually after the pressure-producing obstruction has been removed.

Figure 2:
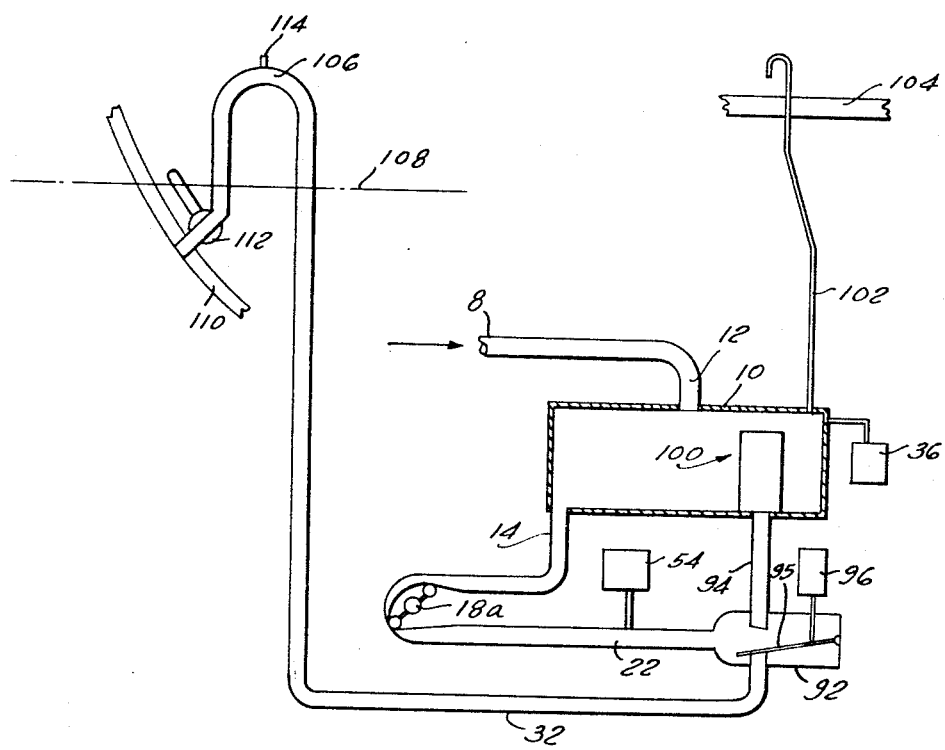
FIG. 2 is a schematic diagram of a second embodiment of the present invention showing additional details, the system of this second embodiment utilizing a single pump driven in the same direction both for recirculation and discharge, an externally actuated valve controlling whether recirculation or discharge takes place.

The system illustrated in FIG. 2 is similar to that of FIG. 1 except that a single unidirectional pump 18a is employed, the pipe 14 always constituting the input to the pump 18a and the pipe 22 always constituting the output therefrom. The pressure switch 54, if employed, may be operatively connected to the pipe 22. The pipe 22 communicates with manifold 92 from which recirculation pipe 94 and discharge pipe 32 extend, fluid connection between the manifold 92 and pipe 94 or 32 being controlled by valve 95 actuated in any appropriate manner, as by means of solenoid 96. The pipe 94 communicates with the interior of the tank 10 via a solids-reduction means generally designated 100 which may take the form described below and shown in FIGS. 7–11.

In the system of FIG. 2 certain additional details are illustrated, which may also be embodied in the system of FIG. 1. A vent tube 102 communicates between the interior of the tank 10 and the air space above deck 104. The discharge tube 32 is shown extending to a point 106 above the water line 108 and then passing through the hull 110 of the ship at a point below the water line, with a sea-cock 112 being interposed therein. An air valve 114 communicates with that portion of the pipe 32 above the water line. When a sea-cock 112 is employed a pressure switch 54 is generally required, since if the pump 18a is operated while the sea-cock 112 is closed it will be apparent that pressure in the system between the sea-cock 112 and the exit side of the pump 18a will tend to build up.

The control circuitry for the system of FIG. 2 will in the main be similar to that shown in FIG. 5 except that the relay winding 62 will be effective to control the electromagnet 96 rather than the reversing switches 58, 60 of FIG. 5, the pump 18a being driven while the valve 95 is in its recirculation position, as shown in FIG. 2, the system then being stopped for such period of time as is desired to permit the desired chemical action to be carried out, the pump 18a thereafter being re-energized while the valve 95 is shifted to its position blocking pipe 94 and opening pipe 32, thereby providing for discharge of the waste material.

The system of FIG. 3 is similar to that of FIG. 2, excet that a pair of selectively actuated pumps 18b and 18c are employed. The exit pipe 14 from tank 10 joins with pipes 116 and 118. Pipe 116 goes to the intake side of pump 18b, the outlet side thereof being connected by pipe 94 to the interior of tank 10 via solids-reduction means 100. The pipe 118 goes to the inlet side of pump 18c, the outlet side thereof being connected to discharge pipe 32. The pressure switch 54 may be operatively connected to the discharge pipe 32.

The control circuit for the system of FIG. 3 is shown in FIG. 6, where motors 20b and 20c are designed to drive pumps 18b and 18c respectively, the electrical circuit to pump 20b including normally open relay switch 58' and the electrical connection to motor 20c including normally closed relay switch 60', both operatively actuated by the relay coil 62 as in the circuit of FIG. 5. It will thus be apparent that the circuit of FIG. 6 will cause the following sequence of operations to take place: When the manual switch 56 is depressed relay coil 62 is energized, relay switch 60' is opened, relay switch 58' is closed, motor 20b is energized, and pump 18b is actuated. The contents of the tank 10 are then pumped in recirculatory fashion through pipes 14 and 116, pump 18b, pipe 94 and solids-reduction means 100. After a period of time determined by cam 82 the motor 20 is de-energized, neither pump 18b nor 18c is driven, and the waste material is permitted to stand in the tank 10 for such period of time as may be desired for chemical action. Thereafter, while relay winding 62 is de-energized and hence relay switch 58′ is opened and relay switch 60′ is closed, cam 82 closes the circuit to the switches 58′ and 60′ and thus energizes motor 20c, driving pump 18c. This pump will withdraw the contents of the tank 10 through the pipes 14 and 118 and will discharge said contents through discharge pipe 32.

The system of FIG. 4 is, like the system if FIG. 1, characterized by the use of a single motor-driven pump 18d driven in one direction for recirculation and in another direction for discharge. The piping arrangement in FIG. 4 differs from that in FIG. 1, however, to the end that the pipe 94 should be used for recirculation, thereby permitting it to be employed in conjunction with the solids-reducing means 100 as in the embodiments of FIGS. 2 and 3. That solids-reducing means is provided with a check valve (such as the valve 98 described below) in order to prevent fluid flow in a reverse direction. In the embodiment of FIG. 4 the tank outlet pipe 14 communicates with pipes 120 and 122. The pipe 122 is connected by check valve 124 to pipe 126, which is in turn connected both to pipe 94 and to pipe 128 communicating with one side of the pump 18d. The pipe 120 communicates with pipe 132 via check valve 130, and pipe 132 communicates with pipes 134 and 136. Pipe 134 is connected to the other end of the pump 18d, while pipe 136 is connected to discharge pipe 32 via check valve 138. Each of the check valves 124, 130 and 138 is designed to permit fluid flow upwardly as viewed in the drawing but not downwardly.

The control circuit for the system of FIG. 4 may be the same as that shown in FIG. 5. During the recirculation stage the pump 18d is operated in a counter-clockwise direction as viewed in FIG. 4, the pipe 134 being the inlet thereto and the pipe 128 being the outlet therefrom. The recirculation path for the waste material with respect to the tank 10 is defined by pipes 14 and 120, check valve 130, pipes 132 and 134, pump 18d, pipes 128 and 94, and solids-reduction means 100. For discharge the pump 18d is operated in a clockwise direction, the discharge path for the waste material in the tank 10 being defined by pipes 14 and 122, check valve 124, pipes 126 and 128, pump 18d, pipes 134 and 136, check valve 138 and discharge pipe 32.

FIGS. 7–11 represent a preferred embodiment of the tank 10, the solids-reduction means 100 and the chemical reagent supply means 36. The tank 10 comprises a bottom wall 3, side walls 5, and a removable top wall 7 which may be held in place by screws 9 or other fastening devices. A pair of partitions 11 and 13, together with the solids reduction means 100 subsequently to be described, divide the interior of the tank 10 into communicating chambers 15, 17 and 19 through which the contents of the tank are adapted to flow, the inlet pipe 12 communicating with the right hand end of the chamber 15 and the outlet pipe 14 being located at the left hand end of the chamber 19. Adjacent the outlet opening 14 a downwardly inclined panel 21 may be provided in order to ensure flow of the contents out through the outlet pipe 14. It is important that the interior of the tank 10 be so designed that the liquid in the tank is constrained to a definite path as it moves therethrough in order to ensure thorough recirculation of the waste material during the recirculating stage of operation.

The solids-reduction means 100 comprises an open-topped tube 23 which extends up into the chamber portion 15 adjacent its right hand end. The lower end of the tube 23 communicates with inlet pipe 94 which passes through the bottom wall 3 of the tank 10 and which is provided with ball-type check valve 98. It has at its upper end an outwardly extending circumferential rim 25 which preferably extends completely therearound, and is further provided with a series of circumferentially spaced vertically extending ribs 27 extending downwardly from the rim 25.

Telescopically received over the tube 23 is a cup member 29 having a closed top wall 31 and having a window 33 formed in a portion of one side wall, the window 33 being directed toward the interior of the chamber portion 15 and preferably having a downwardly inclined bottom edge 35. The cup member 29 is slidably telescopically received over the tube member 23, and preferably is received fairly snugly over the rim 25 and ribs 27 of the tube member 23. The cup member 29 is resiliently biased to telescoped position relative to the tube member 23 by means of spring 37 active between the removable portion 7a of the top wall 7 and the top wall 31 of the cup member 29.

During the recirculation stage fluid is pumped back into the tank 10 through the pipe 94 and tube 23. The pressure of that fluid as it is thus pumped is exerted on the underside of the top wall 31 of the cup member 29, forcing that member up against the action of the spring 37. As the pressure within the tube member 23 builds up the cup member 29 will be lifted more and more until a portion of the window 33 extends above the top of the tube member 23. When this occurs the fluid within the tube member 23 can escape through the window into the chamber portion 15 of the tank 10. The shape of the window 33 is preferably rectangular, so that the liquid will be expelled therethrough in the general form of a flat stream. The stream-like action of the fluid, and its passage through a relatively narrow section of the window 33, reduces solids and shreds paper.

If a large mass should reach that portion of the window 33 which is exposed above the tube member 23, the size of the mass being such that it will not pass through that narrow window portion, it will be blocked from moving, the pressure within the tube member 23 will build up, the cup member 29 will be lifted further, and that portion of the window 33 exposed above the top of the tube member 23 will increase in size until the blocked mass can be forced therethrough, the blocked mass being reduced in size by that forced passage. Thus the action of the solids-reducing means 100 will be seen to be self-compensating for the nature of the solids content upon which it acts at any given moment, and it will also have an inherent self-clearing tendency in the event of blockage by large masses.

There is a small clearance between the cup member 29 and the rim 25 of the tube member 23. This allows for a small amount of leakage to take place, providing for continuous water lubrication of the sliding surfaces. The purpose of the downward inclination of the lower edge 35 of the window 33 is to direct some of the spray emanating from the window 33 downwardly, thereby to sweep along any material which might tend to accumulate near the base of the tube member 23.

The fluid, after passing out from the window 33, will travel down the chamber portion 15, back along the chamber portion 17, around the outside of the cup member 29, and then back along the chamber portion 19 to the exit pipe 14.

The top wall portion 7a is removably attached to the top wall proper 7 in any appropriate fashion, as by means of screws 39, in order to make it possible to clean the inside of the tube member 23 and cup member 29 without having to remove the entire top wall 7. Hooks 41 may be provided on the top wall 31 of the cup member 29 in order to enable it to be lifted off from the tube member 23 when the top wall portion 7a is removed.

Figure 9:
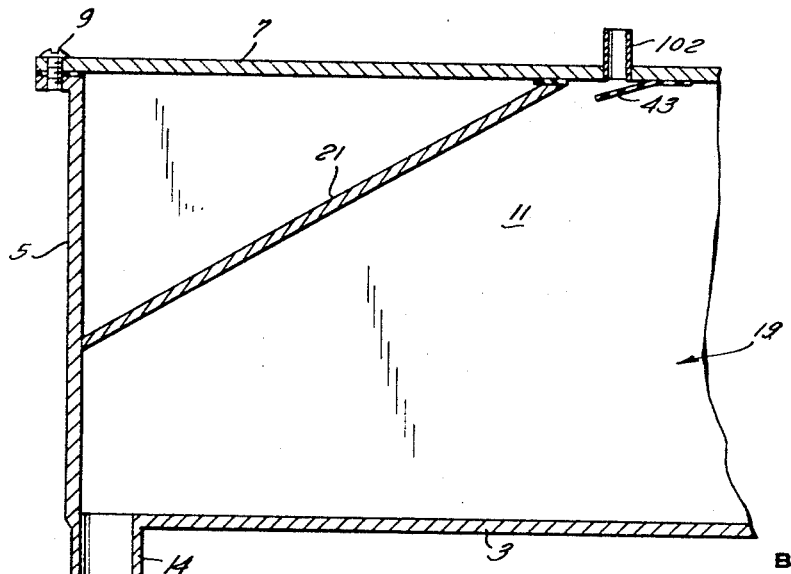
FIG. 9 is a fragmentary cross-sectional view taken along the line 9—9 of FIG. 7.
Figure 7:
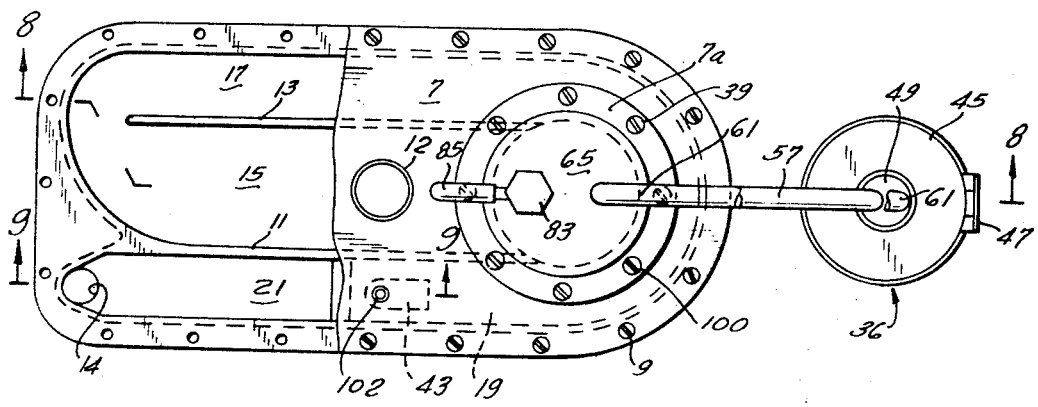
FIG. 7 is a top plan view of a preferred embodiment of the system tank and associated treating chemical supply means.
Figure 8:
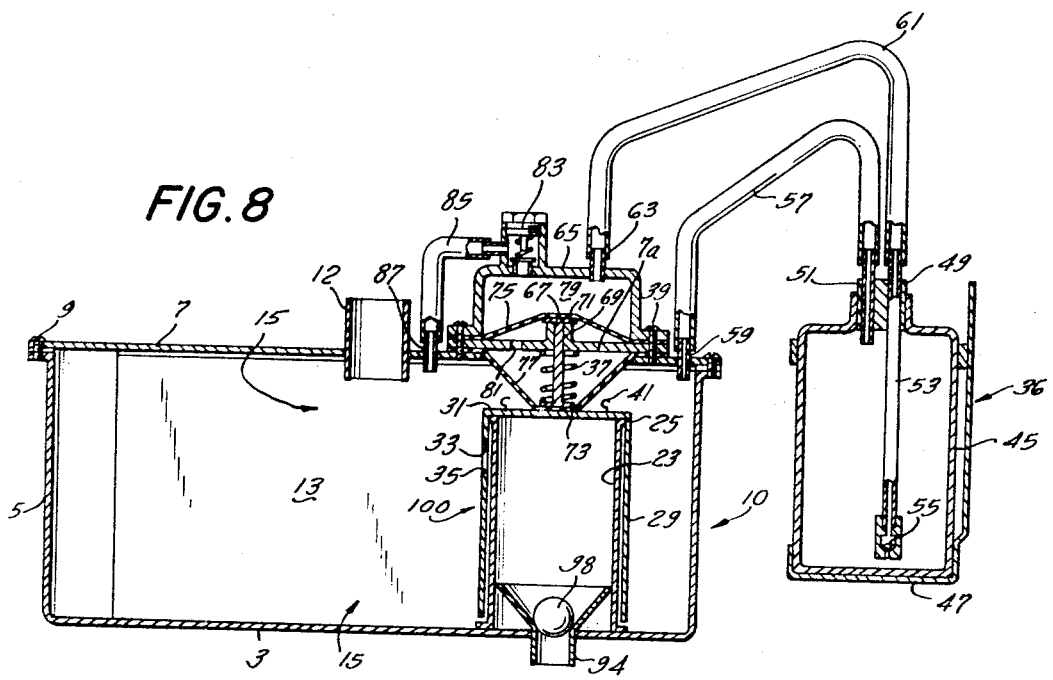
FIG. 8 is a cross-sectional view taken along the line 8—8 of FIG. 7.

Vent pipe 102 is located near the outlet pipe 14. A flapper valve 43 is associated therewith. The flapper 43 will normally be open, as shown in FIG. 9, but in the event that the water level adjacent the vent pipe 102 should reach the top of the tank, the valve 43 will automatically close, thus preventing any escape of waste material through the vent pipe 102.

The means 36 for adding predetermined amounts or "doses" of treating chemicals such as disinfectants to the waste material in the tank 10 is here shown as being automatically actuated in accordance with each operation of the waste disposal system. A bottle 45 containing the chemical in question is mounted in a suitable bracket 47. It is provided with a stopper 49 through which tubes 51 and 53 extend, the tube 51 terminating at the top of the bottle 45 and the tube 53 extending to the bottom of the bottle, there being provided with a ball-type check valve 55. Tube 57 connects the tube 51 to a tube 59 passing through the top wall 7 of the tank 10. Tube 61 connects tube 53 to tube 63 which passes through housing 65 secured to and extending above the top wall section 7a. The top wall section 7a is provided with an opening 67 through which a rod 69 slidably passes, the rod having upper and lower widened end portions 71 and 73 respectively which engage the lower and upper surfaces respectively of diaphragms 75 and 77, the former extending above the top wall section 7a and the latter extending therebelow. It will be seen that a chamber 79 of variable volume is defined within the housing 65 between the housing wall and the diaphragm 75, that chamber communicating with the interior of the bottle 45 via pipe 63, tube 61 and tube 53. Diaphragm 77 bears against the upper wall 31 of the cup member 29, and the spring 37 is received around the rod 69 and is compressed between the top wall section 7a and the lower widened end portion 73 of the rod 69. A hole 81 is provided in the top wall section 7a so as to make for free communication between the air spaces immediately above and immediately below the top wall section 7a and enclosed by the diaphragms 75 and 77 respectively. A fluid communication path is provided between chamber 79 and the interior of the tank 10, that path including spring loaded check valve 83, tube 85 and pipe 87, the latter passing through the tank top wall 7.

At the start of a treatment cycle the chamber 79 will be filled with the appropriate chemical sucked from the bottle 45. When the recirculation stage starts, as we have seen, the cup member 29 is lifted relative to the tube member 23 until the window 33 is opened to a predetermined degree. As the cup member 29 rises the diaphragm 75 will be moved upwardly by the rod 69, thus reducing the volume of the chamber 79. This will cause some of the liquid in that chamber to be forced upwardly to open the check valve 83, that liquid then passing into the chamber portion 15 of the tank 10 via the tube 85 and pipe 87. When the recirculation stage terminates the spring 37 will force the cup member 29 down, the diaphragm 75 will move down, the volume of the chamber 79 will increase, and additional chemical liquid will be sucked up from the bottle 45 into the chamber 79 via the check valve 55 through tubes 53, 61 and 63.

The cup member 29 may vibrate up and down during a recirculation cycle as larger and smaller solid masses are presented to the window 33. In order to prevent this movement of the cup member 29 from feeding additional amounts of chemical to the waste material within the tank 10, the spring loading of the check valve 83 can be made comparatively strong. An additional reason for utilizing a strongly loaded check valve 83 is to prevent the siphoning of chemical into the tank 10 when, as will usually be the case on shipboard, the tank 10 is located at a low point in the vessel, such as in the bilge, thereby to permit material pumped from the toilet 2 to flow by gravity into the tank 10, while the bottle 45 containing the disinfectant or other chemical is located at some higher position in the vessel, such as in the head, where ready access to it is provided for refilling and replacement.

The fluid passage defined by pipe 51, tube 57 and pipe 59 is to maintain atmospheric pressure at the top of the bottle 45 as liquid is withdrawn therefrom, the interior of the tank 10 being kept at atmospheric pressure by virtue of the vent tube 102.

The arrangement comprising the two diaphragms 75 and 77 serves to physically separate the spring 37 from the contents of the tank 10.

From the above it will be seen that a simple arrangement has been devised, well suited for inclusion in small sailboats, cabin cruisers and other pleasure craft, by means of which adequate and effective treatment of waste material can be accomplished easily and reliably and at low cost. Untreated sewage will no longer be discharged, and the problems of water pollution will be greatly alleviated. All that the operator need do, after charging the tank 10 by flushing the toilet 2 in conventional fashion, is to set the system into operation by closing an appropriate switch. Thereafter the waste material will be ground so as to reduce its solids content to a desired degree of fineness and it will at the same time be mixed with an appropriate amount of chemical to provide for disinfection or any other appropriate chemical action. The length of time that the grinding operation takes place and the length of time that the waste material is subjected to chemical action is automatically controlled by the system in accordance with such requirements as have been predetermined. Thereafter the chemically treated and solids-reduced waste material is automatically discharged. This is all accomplished by simple and sturdy equipment, and in such a fashion that a maximum degree of solids-reduction is achieved in minimum time in a substantially clog-proof manner.

While but a limited number of embodiments of the present invention have been here specifically disclosed, it will be apparent that many variations may be made therein, all within the scope of the present invention as defined in the following claims.

I claim:

1. In combination with a toilet, a waste disposal system comprising a tank, means effective to introduce the flushed materials from said toilet into said tank, recirculating means independent of said flushed materials introducing means effective to remove contents from and then to return contents to said tank without passing them through said toilet, discharge means effective to remove contents from said tank and to discharge them from said system, and control means for selectively actuating first said recirculating means and then said discharge means.

2. The system of claim 1, in which said recirculating means comprises means for acting upon said contents as they reenter said tank and reducing such solids as are included therein.

3. The system of claim 2, in which said discharge means and said recirculating means comprise a single powered pump driven in opposite directions for each of said two means respectively, said tank having an outlet conduit and a recirculation input and said system having a discharge conduit, said outlet conduit and said recirculation input being operatively connected to opposite sides of said pump during operation thereof in recirculating direction to comprise said recirculating means, and said outlet conduit and said discharge conduit being operatively connected to opposite sides of said pump during operation thereof in discharge direction to comprise said discharge means.

4. The system of claim 2, in which said discharge means and said recirculating means comprise a single powered pump driven in opposite directions for each of said two means respectively, said tank having an outlet conduit and a recirculation input and said system having a discharge conduit, said outlet conduit and said recirculation input being operatively connected to opposite sides of said pump during operation thereof in recirculating direction to comprise said recirculating means, and said

11 outlet conduit and said discharge conduit being operatively connected to opposite sides of said pump during operation thereof in discharge direction to comprise said discharge means, said connection being accomplished by pressure-sensitive valve means effective to appropriately open and close in response to fluid pressure developed by said pump when driven in one direction or the other.

5. The system of claim 2, in which said discharge means and said recirculating means comprise a single powered pump, said tank having an outlet conduit operatively connected to one side of said pump, said tank having a recirculation input and said system having a discharge conduit each operatively connected to the other side of said pump by valve means effective to connect one thereto and disconnect the other therefrom, said control means comprising means for selectively actuating said valve means.

6. The system of claim 1, in which said discharge means and said recirculating means comprise a single powered pump driven in opposite directions for each of said two means respectively, said tank having an outlet conduit and a recirculation input and said system having a discharge conduit, said outlet conduit and said recirculation input being operatively connected to opposite sides of said pump during operation thereof in recirculating direction to comprise said recirculating means, and said outlet conduit and said discharge conduit being operatively connected to opposite sides of said pump during operation thereof in discharge direction to comprise said discharge means.

7. The system of claim 1, in which said discharge means and said recirculating means comprise a single powered pump driven in opposite directions for each of said two means respectively, said tank having an outlet conduit and a recirculation input and said system having a discharge conduit, said outlet conduit and said recirculation input being operatively connected to opposite sides of said pump during operation thereof in recirculating direction to comprise said recirculating means, and said outlet conduit and said discharge conduit being operatively connected to opposite sides of said pump during operation thereof in discharge direction to comprise said discharge means, said connection being accomplished by pressure-sensitive valve means effective to appropriately open and close in response to fluid pressure developed by said pump when driven in one direction or the other.

8. The system of claim 1, in which said discharge means and said recirculating means comprise a single powered pump, said tank having an outlet conduit operatively connected to one side of said pump, said tank having a recirculation input and said system having a discharge conduit each operatively connected to the other side of said pump by valve means effective to connect one thereto and disconnect the other therefrom, said control means comprising means for selectively actuating said valve means.

9. The system of claim 1, in which said recirculating means comprises a hollow member extending into said tank through which said recirculated contents are adapted to be fed, an inverted cup member slidably telescopically received with respect to said hollow member, resilient means active on at least one of said members for urging said members to telescope relative to one another, means for exposing the interior of said cup member to the pressure of fluid in said hollow member and to cause said cup member to move in untelescoping direction relative to said hollow member in response to said pressure and in opposition to the action of said resilient means, and window means in one of said members communicating between said tank and said hollow member, said other of said members substantially closing said window means when said members are telescoped relative to one another and opening said window means when said members are relatively untelescoped to a predetermined extent.

10. In the system of claim 9, means for delivering predetermined amounts of chemicals to the contents of said tank, said delivering means being operatively connected to said telescoping members and actuated in response to relative movement thereof.

11. The system of claim 9, in which said hollow member is the inner of said telescoping members, is open-topped, thereby to define said pressure exposing means, and is provided with an outwardly extending circumferential portion and a plurality of vertical outwardly extending and circumferentially spaced ribs, said cup member being the outer of said telescoping members and fitting snugly but slidably over said outwardly extending portion of said hollow member.

12. In the system of claim 11, means for delivering predetermined amounts of chemicals to the contents of said tank, said delivering means being operatively connected to said telescoping members and actuated in response to relative movement thereof.

13. In a waste disposal system, means for acting upon the contents of said system to reduce such solids as are included therein, said means comprising a hollow member through which said system contents are adapted to be fed, an inverted cup member slidably telescopically received with respect to said hollow member, resilient means active on at least one of said members urging said members to telescope relative to one another, means exposing the interior of said cup member to the pressure of fluid in said hollow member and to cause said cup member to move in untelescoping direction relative to said hollow member in response to said pressure and in opposition to the action of said resilient means, and window means in one of said members communicating between said hollow member and the space surrounding it, said other of said members substantially closing said window means when said members are telescoped relative to one another and opening said window means when said members are relatively untelescoped to a predetermined extent.

14. In combination with the contents-solids-reducing means of claim 13, means for delivering predetermined amounts of chemicals to the contents of said system, said delivery means being operatively connected to said telescoping members and actuated in response to relative movement thereof.

15. The contents-solids-reducing means of claim 13, in which said hollow member is the inner of said telescoping members, is open-topped, thereby to define said pressure exposing means, and is provided with an outwardly extending circumferential portion and a plurality of vertical outwardly extending and circumferentially spaced ribs, said cup member being the outer of said telescoping members and fitting snugly but slidably over said outwardly extending portion of said hollow member.

16. A waste disposal system comprising a tank, first inlet means to said tank, outlet means from said tank, recirculating means for removing contents from and then returning contents to said tank, discharge means for removing contents from said tank and discharging them from said system, and control means for selectively actuating first said recirculating means and then said discharge means, in which said recirculating means comprises a hollow member extending into said tank through which said recirculated contents are adapted to be fed, an inverted cup member slidably telescopically received with respect to said hollow member, resilient means active on at least one of said members for urging said members to telescope relative to one another, means for exposing the interior of said cup member to the pressure of fluid in said hollow member and to cause said cup member to move in untelescoping direction relative to said hollow member in response to said pressure and in opposition to the action of said resilient means, and window means in one of said members communicating between said tank and said hollow member, said other of said members substantially closing said window means when said members are telescoped relative to one another and opening said window means when said members are relatively untelescoped to a predetermined extent.

17. In the system of claim 16, means for delivering predetermined amounts of chemicals to the contents of said tank, said delivering means being operatively connected to said telescoping members and actuated in response to relative movement thereof.

18. In the system of claim 16, in which said hollow member is the inner of said telescoping members, is open-topped, thereby to define said pressure exposing means, and is provided with an outwardly extending circumferential portion and a plurality of vertical outwardly extending and circumferentially spaced ribs, said cup member being the outer of said telescoping members and fitting snugly but slidably over said outwardly extending portion of said hollow member.

19. In the system of claim 18, means for delivering predetermined amounts of chemicals to the contents of said tank, said delivering means being operatively connected to said telescoping members and actuated in response to relative movement thereof.

References Cited

UNITED STATES PATENTS

| | | | |
|---|---|---|---|
| 442,158 | 12/1890 | West | 210—136 |
| 763,606 | 6/1904 | Hettinger | 210—219 X |
| 2,786,025 | 3/1957 | Lamb et al. | 210—197 X |
| 2,858,939 | 11/1958 | Corliss | 210—173 X |
| 2,957,487 | 10/1960 | Armbrust | 210—198 X |
| 3,220,553 | 11/1965 | Growall et al. | 210—136 X |
| 3,323,650 | 6/1967 | Kilbane | 210—152 |

REUBEN FRIEDMAN, *Primary Examiner.*

J. ADEE, *Assistant Examiner.*

U.S. Cl. X.R.

210—138, 152, 197, 219.